(12) United States Patent
Xu et al.

(10) Patent No.: US 11,704,554 B2
(45) Date of Patent: Jul. 18, 2023

(54) AUTOMATED TRAINING DATA EXTRACTION METHOD FOR DYNAMIC MODELS FOR AUTONOMOUS DRIVING VEHICLES

(71) Applicant: Baidu USA LLC, Sunnyvale, CA (US)

(72) Inventors: Jiaxuan Xu, Sunnyvale, CA (US); Qi Luo, Sunnyvale, CA (US); Runxin He, Sunnyvale, CA (US); Jinyun Zhou, Sunnyvale, CA (US); Jinghao Miao, Sunnyvale, CA (US); Jiangtao Hu, Sunnyvale, CA (US); Yu Wang, Sunnyvale, CA (US); Shu Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 486 days.

(21) Appl. No.: 16/404,733

(22) Filed: May 6, 2019

(65) Prior Publication Data

US 2020/0356849 A1 Nov. 12, 2020

(51) Int. Cl.
*G06N 3/08* (2023.01)
*G06N 20/00* (2019.01)

(52) U.S. Cl.
CPC .............. *G06N 3/08* (2013.01); *G06N 20/00* (2019.01)

(58) Field of Classification Search
CPC ........ G06N 3/08; G06N 20/00; G06N 3/0445; G09B 9/04
See application file for complete search history.

(56) References Cited

U.S. PATENT DOCUMENTS

| 10,254,760 B1 | 4/2019 | Abeloe |
| 2019/0065944 A1 | 2/2019 | Hotson et al. |
| 2020/0111011 A1* | 4/2020 | Viswanathan ....... G01C 21/005 |

FOREIGN PATENT DOCUMENTS

| CN | 107169567 A | 9/2017 |
| CN | 107783943 A | 3/2018 |
| CN | 108897313 A | 11/2018 |

OTHER PUBLICATIONS

Anusha Nagabandi, Gregory Kahn, Ronald S Fearing, and Sergey Levine. Neural network dynamics for model-based deep reinforcement learning with model-free fine-tuning. arXiv preprint arXiv:1708.02596, 2017. https://arxiv.org/pdf/1708.02596.pdf (Year: 2017).*

(Continued)

*Primary Examiner* — Viker A Lamardo
*Assistant Examiner* — Michael H Hoang
(74) *Attorney, Agent, or Firm* — Womble Bond Dickinson (US) LLP

(57) ABSTRACT

In one embodiment, a method of training dynamic models for autonomous driving vehicles includes the operations of receiving a first set of training data from a training data source, the first set of training data representing driving statistics for a first set of features; training a dynamic model based on the first set of training data for the first set of features; determining a second set of features as a subset of the first set of features based on evaluating the dynamic model, each of the second set of features representing a feature whose performance score is below a predetermined threshold. The method further includes the following operations for each of the second set of features: retrieving a second set of training data associated with the corresponding feature of the second set of features, and retraining the dynamic model using the second set of training data.

14 Claims, 10 Drawing Sheets

(56) References Cited

OTHER PUBLICATIONS

Wang, Sen, Daoyuan Jia, and Xinshuo Weng. "Deep reinforcement learning for autonomous driving." arXiv preprint arXiv: 1811.11329 (2018). https://arxiv.org/pdf/1811.11329v1.pdf (Year: 2018).*

Eraqi, Hesham M., Mohamed N. Moustafa, and Jens Honer. "End-to-end deep learning for steering autonomous vehicles considering temporal dependencies." arXiv preprint arXiv: 1710.03804 (2017). https://arxiv.org/pdf/1710.03804.pdf (Year: 2017).*

Codevilla, Felipe, et al. "End-to-end driving via conditional imitation learning." 2018 IEEE International Conference on Robotics and Automation (ICRA). IEEE, 2018. https://ieeexplore.ieee.org/stamp/stamp.jsp?tp=&arnumber=8460487 (Year: 2018).*

Bojarski, Mariusz, et al. "End to end learning for self-driving cars." arXiv preprint arXiv:1604.07316 (2016). https://arxiv.org/pdf/1604.07316.pdf (Year: 2016).*

Amini, Alexander, et al. "Learning steering bounds for parallel autonomous systems." 2018 IEEE International Conference on Robotics and Automation (ICRA). IEEE, 2018. https://ieeexplore.ieee.org/stamp/stamp.jsp?tp=&arnumber=8461253 (Year: 2018).*

Xu, Huazhe, et al. "End-to-end learning of driving models from large-scale video datasets." Proceedings of the IEEE conference on computer vision and pattern recognition. 2017. (Year: 2017).*

Anusha Nagabandi at el. Neural Network Dynamics for Model-Based Deep Reinforcement Learning with Model-Free Fine-Tuning, 2018 IEEE International Conference on Robotics and Automation, May 25, 2018, total 9 pages.

Sen Wang at el, Deep Reinforcement Learning for Autonomous Driving, arVivLabs, Nov. 28, 2018, total 9 pages.

Mariusz Bojarski at el, End to End Learning for Self-Driving Cars, arVivLabs, Apr. 25, 2016, total 9 pages.

* cited by examiner

| Speed | 0 - 5 mps, 5 - 10 mps, 10 - 15 mps, 15 - 20 mps, 20 - 25 mps |
|---|---|
| Accelerator (Deceleration) | Throttle: 15% (deadzone) – 20%, 20% - 25%, 25% - 30%, 25% - 35%, 35% - 40%, 40% - 45%, 45% - 50% <br> Brake: 14% (deadzone) – 20%, 20% - 25%, 25% - 30%, 25% - 35%, 35% - 40% |
| Steering Angle | ± 0 – 20%, ± 20 – 40%, ± 40 – 60%, ± 60 – 80%, ± 80 – 100% |

FIG. 5

| Longitudinal | Lateral | Joint |
|---|---|---|
| 1. Accelerating Scenario (throttle 20%, 40%, 60%, 80%, 100%, at speed 0 mph, 10 mph, 20 mph, 30 mph, 40 mph, 50 mph, 60 mph)<br>2. Braking Scenario (brake 20%, 40%, 60%, 80%, 100%, at speed 0 mph, 10 mph, 20 mph, 30 mph, 40 mph, 50 mph, 60 mph)<br>3. Idle Speeding Scenario<br>4. Reversing Driving Scenario | 1. Left/Right Turn (± 30-degree, ± 60-degree, ± 90-degree, ± 120-degree, ± 150-degree)<br>2. U-Turn (± 180-degree)<br>3. S-shape (5 obstacles/100m, 10 obstacles/100m, 20 obstacles/100m)<br>4. Corner Back-up (left/right 90-degree turn + reverse driving) | 10 mins Urban Road driving (Straight, Left-right turn, U-turn, Lane Changing)<br><br>1. Control Open-Loop<br>2. Control Close-Loop |

| Longitudinal Error/Value | Root Mean Squared Error/ Root Mean Squared Value | Expectation |
|---|---|---|
| Acceleration $a$ | $\sqrt{E((\hat{a}-a)^2)}/\sqrt{E(a^2)}$ | <10% |
| Velocity $v$ | $\sqrt{E((\hat{v}-v)^2)}/\sqrt{E(v^2)}$ | <10% |
| Lateral Error/Value | Root Mean Squared Error/ Root Mean Squared Value | Expectation |
| Angular Speed $\omega$ | $\sqrt{E((\hat{\omega}-\omega)^2)}/\sqrt{E(\omega^2)}$ | <10% |
| Heading $\theta$ | $\sqrt{E((\hat{\theta}-\theta)^2)}/\sqrt{E(\theta^2)}$ | <10% |
| Joint Error (Trajectory) | Root Mean Squared Error | Expectation |
| 1 min Trajectory | $\sqrt{E((\hat{r}-r)^2)}$ | < 10 m |
| 3 min Trajectory | $\sqrt{E((\hat{r}-r)^2)}$ | < 15 m |
| 5 min Trajectory | $\sqrt{E((\hat{r}-r)^2)}$ | < 20 m |
| Gear Shift Delay Error | Root Mean Squared Error/ Root Mean Squared Value | Expectation |
| Gear Shift Time $t$ | $\sqrt{E((\hat{t}-t)^2)}/\sqrt{E(t^2)}$ | <10% |

AUTOMATED TRAINING DATA EXTRACTION METHOD FOR DYNAMIC MODELS FOR AUTONOMOUS DRIVING VEHICLES

TECHNICAL FIELD

Embodiments of the present disclosure relate generally to operating autonomous vehicles. More particularly, embodiments of the disclosure relate to a method of training dynamic models for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors and high-definition maps, allowing the vehicle to travel with minimal human interaction or in some cases without any passengers.

An autonomous driving vehicle (ADV) relies on various modules to plan trajectories and control actuator commands. Processes and algorithms used in these modules often need to be tested, or adjusted in response to changed driving environments. A dynamic model describes the dynamic characteristics of an ADV, and can predict the ADV's future states based on the vehicle's current states and actuator commands. A dynamic model can be used in a simulator to fine-tune actuators and design control algorithms for use in real-time autonomous driving.

A dynamic model can be embodied in a deep neural network (DNN), whose inference accuracy and robustness largely depend on how the dynamic model is trained and what training data are used.

Training data can be selected either manually or fed with on selection to a machine learning model. Neither approach is ideal. On-selected training data can be unbalanced, which would jeopardize the performance of a trained model, while manually selecting training data is time-consuming and inefficient. On the other hand, the process of training a dynamic model is also critical in generating a dynamic model that is robust and has high inference accuracy.

BRIEF DESCRIPTION OF THE DRAWINGS

Embodiments of the disclosure are illustrated by way of example and not limitation in the figures of the accompanying drawings in which like references indicate similar elements.

FIG. 5 illustrates an example training data extraction plan for training a dynamic model in accordance with an embodiment.

FIG. 6 illustrates examples of controlled testing scenarios for evaluating a dynamic model in accordance with an embodiment.

FIG. 7 illustrates examples of evaluation metrics for a dynamic model in accordance with an embodiment.

DETAILED DESCRIPTION

Figure 1:
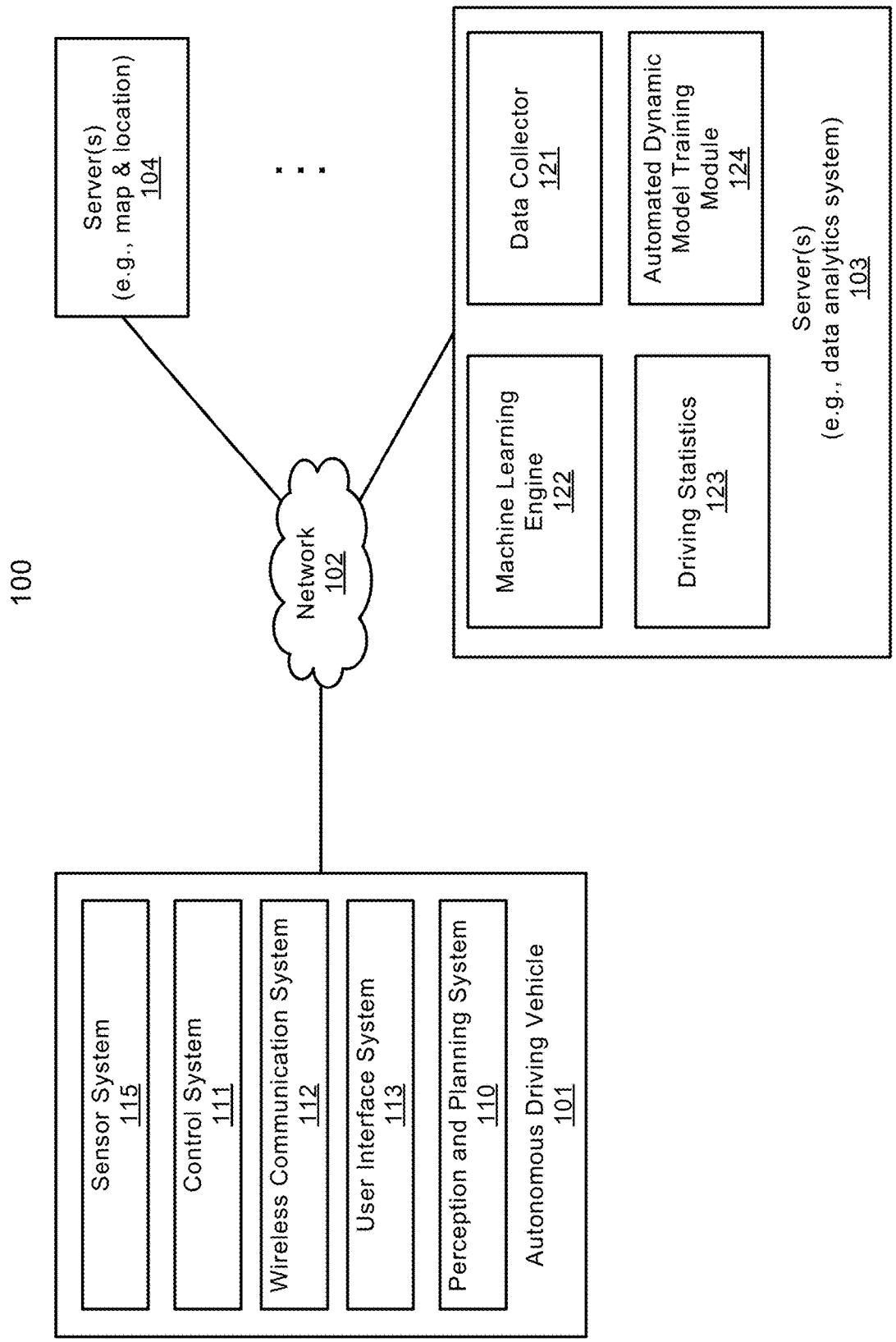
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As used herein, a feature is one of many driving parameters of an autonomous driving vehicle, or one of many driving scenarios of the autonomous driving vehicle. Examples of features include speed, accelerator, angular velocity, throttle, brake, steering angle; and examples of driving scenarios include U-turn, left turn, right turn, reverse driving, and driving straight. A feature set refers to a set of multiple features. A feature scenario is a value of one of the features, or a combination of values from multiple features.

According to various embodiments, a machine-learning-based dynamic model training method described herein provides an automated close-loop training process for a dynamic model. In the training process, training data are automatically extracted according to a pre-defined feature set and performance of the dynamic model under controlled testing scenarios. The process also includes dynamic model training and dynamic model evaluation. In the training data extraction phase, a number of equally-spaced value ranges are defined for each feature of the pre-defined feature set, and an equal amount of data for each of the number of predetermined ranges is extracted. A dynamic model can then be trained using the extracted data, and can be graded on a number of controlled testing scenarios. Additional data for one or more features that receive low scores can be extracted to retrain the dynamic model. The loop can continue until the dynamic model achieves a preset score for each pre-defined feature.

In one embodiment, a method of training dynamic models for autonomous driving vehicles includes receiving a first set of training data from a training data source, the first set of training data representing driving statistics for a first set of features; training a dynamic model based on the first set of training data for the first set of features; determining a second set of features as a subset of the first set of features based on evaluating the dynamic model, each of the second set of features representing a feature whose performance score is below a predetermined threshold. The method further includes the following operations for each of the second set of features: retrieving a second set of training data associated with the corresponding feature of the second set of features, and retraining the dynamic model using the second set of training data.

In one embodiment, the method further includes iteratively performing retrieving the second set of training data and retraining the dynamic model, until the corresponding performance score is above the predetermined threshold or a number of iterations reaches a predetermined iteration value.

In one embodiment, each of the first set of features represents one of many driving parameters, examples of which include speed, accelerator, angular velocity, throttle, brake, and steering angle, U-turn, left turn, or right turn.

In one embodiment, extracting the first set of training data from the training data source includes determining a plurality of equally-spaced value ranges for each of the first set of features; and selecting a value from each of the plurality of ranges for the feature. The first set of training data includes multiple feature scenarios, each feature scenario representing a selected value for one of the first set of features, or a combination of selected values for multiple features of the first set of features.

In one embodiment, the dynamic model is evaluated based on driving statistics generated, under a plurality of controlled feature scenarios, by an ADV for which the dynamic model has been trained. Each controlled feature scenarios can represent a selected value for one of the first set of features, or a combination of selected values for multiple features of the first set of features. Evaluating the dynamic model can include determining, from the controlled feature scenarios, a set of controlled feature scenarios associated with each feature of the first set of features; applying each of the set of controlled feature scenarios as inputs to the dynamic model; comparing an output of the dynamic model to each of the inputs against a ground truth value of the ADV in response to the input; computing a root mean squared error for each feature of the first set of features; computing a performance score for each feature of the first set of features; and determining the second set of features based on based on their performance scores.

In one embodiment, the dynamic model is one of a plurality of dynamic models trained using the first set of training data from the training data source. The dynamic model is a model that receives a highest score based on inference performance. The dynamic model can be a neural network model represented by one of a linear regression, a multilayer perceptron (MLP), or a recurrent neural network (RNN).

In one embodiment, the training data source stores driving statistics collected from a variety of vehicles driven by human drivers, wherein the driving statistics include information indicating driving commands issued and responses of the vehicles captured by sensors of the vehicles at different points in time.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

In one embodiment, sensor system 115 includes one or more cameras, global positioning system (GPS) unit, inertial measurement unit (IMU), radar unit, and a light detection and range (LIDAR) unit. The sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, the vehicle control system 111 includes a steering unit, throttle unit (also referred to as an acceleration unit), and a braking unit. The steering unit is to adjust the direction or heading of the vehicle. The throttle unit is to control the speed of the motor or engine that in turn control the speed and acceleration of the vehicle. The braking unit is to decelerate the vehicle by providing friction to slow the wheels or tires of the vehicle.

In one embodiment, the wireless communication system 112 is to allow communication between autonomous vehicle

101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, the machine learning engine 122 can train a dynamic model. An automated dynamic model training model can be provided in the server 103 to control the extraction of training data from the driving statistics 123 and the training of the dynamic model using the extracted driving statistics.

Dynamic Model Training

Figure 2:
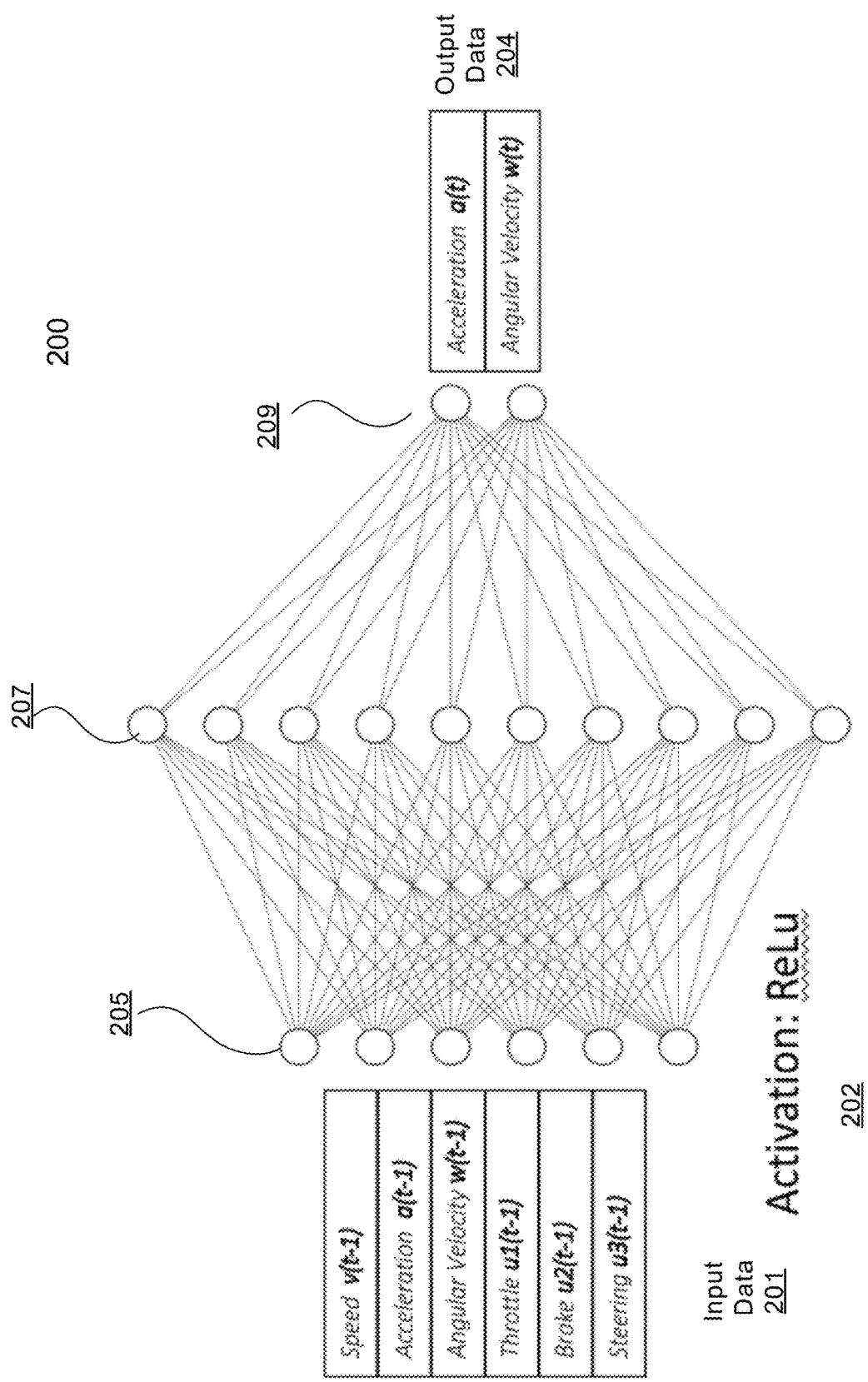
FIG. 2 illustrates an example dynamic model in accordance with an embodiment.

FIG. 2 illustrates an example dynamic model in accordance with an embodiment. In this example, the dynamic model 200 can be a multilayer perceptron (MLP) neural network model trained using real-world data collected by sensors in vehicles. The dynamic model includes a collection of connected neurons designed to model a human brain. Neurons in the dynamic model can be fully connected, with each node in one layer connecting with a certain weight to every node in the following layer. During the training of the dynamic model, the dynamic model changes connection weights after each piece of data is processed based on the amount of error in the output compared to the expected result.

In one embodiment, the dynamic model 200 can include an input layer 205 to receive input data 201, an output layer 209 that makes decisions or predictions or classify about the input data, and an arbitrary number of hidden layers (for example, hidden layer 207) between the input layer 201 and the output layer 209. The hidden layers are the computational engine of the dynamic model 200. Neurons in the hidden layer 207 can include activation functions for transforming the input data 201. Rectified Linear Unit (ReLU) 202 indicates an example activation function used in the dynamic model 200. ReLu 202 returns 0 if it receives any negative input; and for any positive value returns, it returns that value back. Although FIG. 200 shows one hidden layer 207 and one output layer 209, the dynamic model 200 can include multiple hidden layers and multiple output layers.

In an embodiment, the input data 201 for the neural network model 200 includes states of an ADV (e.g., a speed, an acceleration, and an angular velocity), and control commands (e.g., a throttle command, a brake command, and a steering command) for a first driving cycle. The input data 201 can be processed by one or more hidden layers and transformed to the output data 204, which are expected states of the ADV for a second driving cycle. Based on the acceleration and angular velocity over time, the speed of the ADV for the second driving cycle can be computed. The input data represents a number of feature scenarios (i.e. states) of the ADV.

Figure 3:
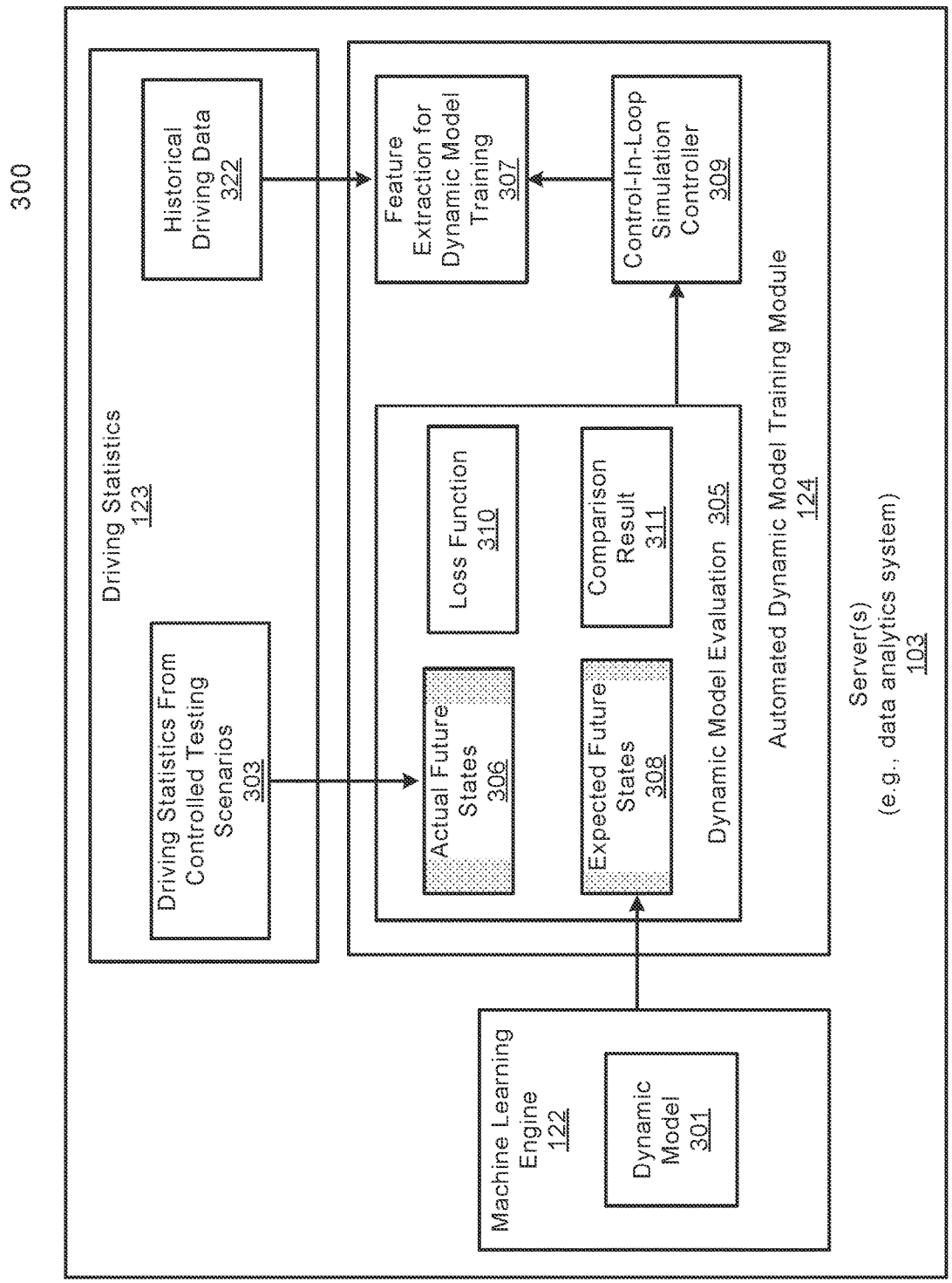
FIG. 3 illustrates an example system 300 for training a dynamic model shown in FIG. 2 in accordance with an embodiment.

FIG. 3 illustrates an example system 300 for training a dynamic model shown in FIG. 2 in accordance with an embodiment. As shown in FIG. 3, the example dynamic training system 300 includes the automated dynamic training module 124, a feature extraction module 307, a training controller 309, historical driving statistics 322, and driving statistics 303 for controlled testing scenarios.

The historical driving statistics 322 includes real-world data collected by sensors (e.g., IMU and GPS) to record real-time dynamics (e.g., states) of vehicles in various scenarios that may cover a variety of road types, obstacle types and road environments. For example, the real-world data can be downloaded from the Apollo Open Data Platform of BAIDU™. The driving statistics 303 for controlled testing scenarios are real-world data generated by vehicles driven by human drivers.

In one embodiment, the training controller 309 can implement an algorithm to automate a process of extracting training data, training a dynamic model using the training data, evaluating the dynamic model iteratively, until the control model meets the specified requirements.

In one embodiment, the training controller 309 can automatically generates a predetermined equally-spaced value ranges for each feature of a number of features. As mentioned above, a feature and a driving parameter can be used interchangeably in this disclosure. For example, for the driving parameter of speed, the training controller 309 can generate the following value ranges: 0-5 mps, 5-10 mps, 10-15 mps, 15-20 mps, and 20-25 mps. From each of the equal-spaced value range, the training controller 309 can extract a value from the historical driving statics 322. In one embodiment, the historical driving statistics 322 can be a subset of the Apollo Open Data Platform of BAIDU™, and can be stored in a data storage that is in synchronization with the Apollo Open Data Platform. Therefore, there can be sufficient data points from each range of values.

Once the value ranges for each driving parameter are determined, the training controller 309 can extract data from each range for that driving parameter to create a number of feature scenarios, each of which represents a value for a driving parameter, or a combination of values for multiple driving parameters (also referred to features or driving features in this disclosure).

As an illustrative example, the training controller 309 can create feature scenarios from, e.g., three driving parameters: steering angle, speed, and accelerator. For each driving parameter, the training controller 309 can create a number of equally-spaced ranges. For example, the simulator controller 309 can create 12 equally-space ranges for steering angle, 5 equally-space ranges for speed, and 7 equally-space ranges for accelerator. In one implementation, a total of 420 of feature scenarios (i.e., 12*5*7=420) would be created using a value from each of the above-mentioned ranges. Different numbers of feature scenarios can be created in other implementations.

In one embodiment, the training controller 309 can invoke the feature extraction module 307 to extract the data for creating the feature scenarios. With the training data for each feature scenario, the training controller 309 can invoke services, functions, routines, libraries, and/or application programming interfaces (APIs) provided by the machine learning engine 122 to train a dynamic model 301. The training controller 309 subsequently can evaluate the dynamic model 301 by performing inferences using data from the driving statistics 303. In one embodiment, the training controller 309 can invoke a dynamic module evaluation module 305 to evaluate the dynamic model 301.

As shown in FIG. 3, the dynamic model 301 can receive, from the driving statistics 303, data generated from a number of controlled testing scenarios. Unlike testing data that are generated by vehicles operated in a natural way, the data generated from the controlled testing scenarios can be data generated by a vehicle under a variety of driving scenarios or driving conditions, which are specifically created for the purpose of generating testing data for those driving conditions or driving scenarios.

In one embodiment, the testing data can include ground truth values for a number of carefully designed controlled testing scenarios to test the performance of the training dynamic model 30. A controlled testing scenario is a feature scenario. One or more controlled testing scenarios are designed for each feature.

For example, one controlled testing scenarios would be to turn the steering 180 degrees to the left, another controlled testing scenario would be to turn the steering wheel 180 degree to the right, and yet another controlled testing scenario would be to drive from point A to point B in one minute. For each of the controlled testing scenarios, a ground truth value is recorded in the driving statistics 303, which also store an output of the dynamic model 301 for each of the controlled testing scenarios.

In one embodiment, the driving statistics can include current states of a vehicle and one or more control commands. Examples of the current states include a speed, an acceleration, and an angular velocity of the ADV for a first driving cycle; examples of the control commands include a throttle command, a brake command and a steering command for the first driving cycle. Each current state can have a corresponding expected future state 308 and an actual future state 306 for a second driving cycle. The corresponding expected future state can be the output of the dynamic model 301, while the actual future state 307 can be the ground truth value from the real-world data generated under the controlled testing scenarios.

In an embodiment, the dynamic model evaluation module 305 can compare each actual future state and each expected future state using a loss function 310 to generate a comparison result 311. The dynamic model evaluation module 305 can grade the inference performance of the dynamic model 301 for each feature scenario based on the comparison result 311 and/or the loss function 310.

In one embodiment, each feature scenario can include values for multiple features or a value for one feature. For example, a feature scenario can be a speed of 5 miles per second; a speed of 5 miles per second, a steering angle of 5 degrees to the left; or a speed of 5 miles per second, a steering angle of 5 degrees to the left, and a throttle rate of 15%. Thus, each feature scenario can be associated with one or more features. For all feature scenarios associated with a particular feature, a root mean squared error can be computed based on the comparison result between the ground truth value and an expected value from the dynamic model. A performance score can be calculated using a predetermined algorithm for each root mean squared error for each feature.

Based on the performance scores, the number of features associated with the controlled testing scenarios can be ranked. The training controller 309 can identify one or more features that receive a score lower than a predetermined threshold, and extract additional data using the feature extraction module 307 from the historical driving data 322 for the one or more features to retrain the dynamic model 301. After the retraining using the additional data, the dynamic model evaluation module 305 can be invoked again to evaluate the performance of the dynamic model 301 for the one or more features. The process can be automatically repeated until the dynamic model 301 has met the predetermined requirements for each of the features that are used to train the dynamic model 301 and for which the controlled testing scenarios have been designed.

In one embodiment, the above process of identifying one or more features that receive the lower score than the predetermined threshold can be used to identify one or more features scenarios that receive a score lower than the predetermined threshold. Similarly, the feature extraction module 307 can extract additional data from the for the one or more feature scenarios to retrain the dynamic model 301. After the retraining using the additional data, the dynamic model evaluation module 305 can be invoked again to evaluate the performance of the dynamic model 301 for the one or more feature scenarios. The process can be automatically repeated until the dynamic model 301 has met the predetermined requirements for each of the feature scenarios that have been previously created.

Figure 4:
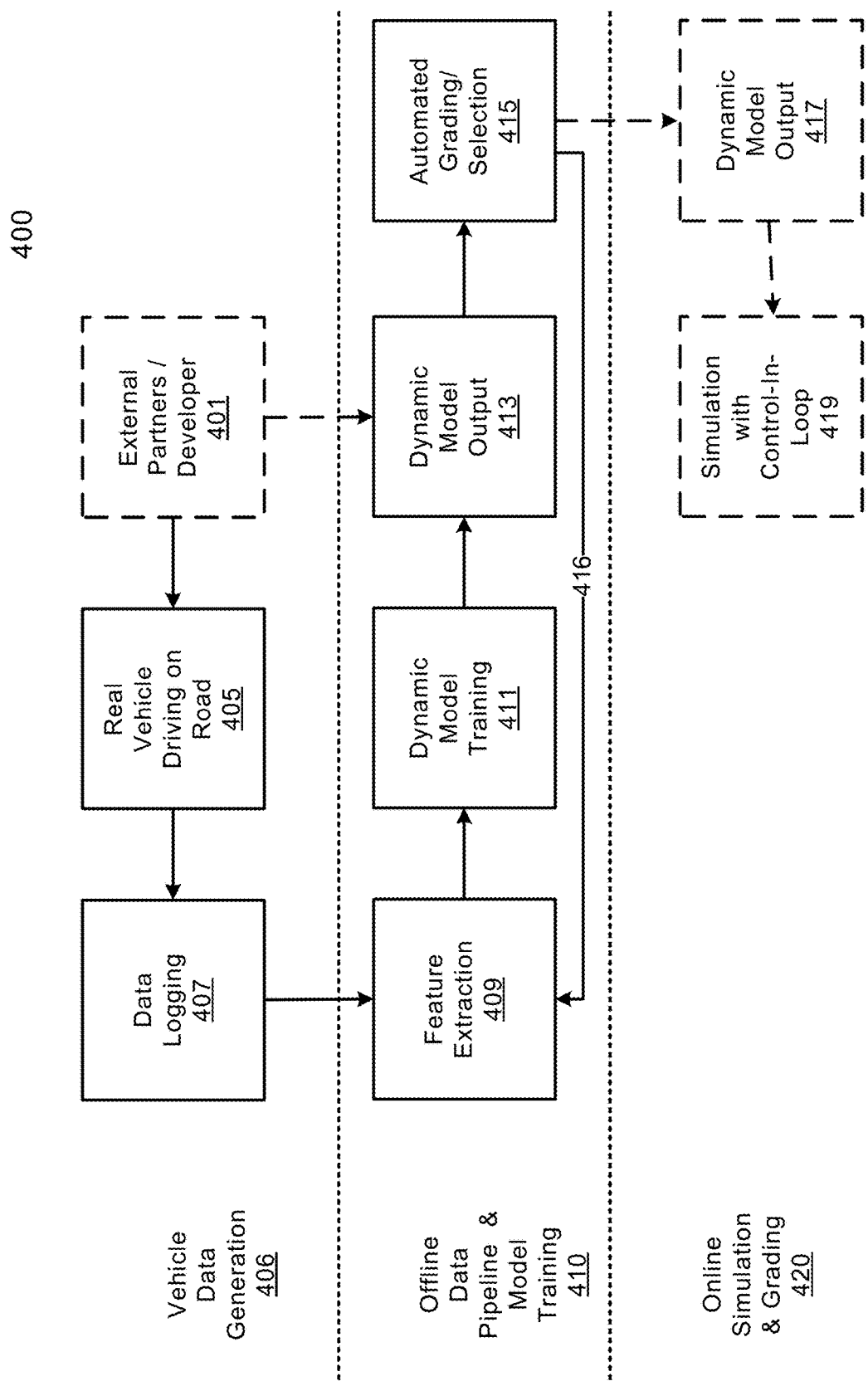
FIG. 4 illustrates an example flow diagram of training a dynamic model in accordance with an embodiment.

FIG. 4 illustrates an example flow diagram 400 of training a dynamic model in accordance with an embodiment.

As shown in FIG. 4, an automatic loop of training a dynamic model can include an vehicle data generation 406 phase and an offline data and pipeline & model training phase 410. Once the dynamic model is fully trained and meet all the predefined requirements, the dynamic model can be put into a simulator fine-tune actuators and design control algorithms for use in real-time autonomous driving in an online simulation & grading phase 420.

More specifically, during the vehicle data generation phase 406, external partners or dynamic model developers 401 can collect real-world driving statistics by manually driving vehicles on roads 405, and log the driving statistics in an machine learning training datasets storage, such as the Apollo Open Data Platform of BAIDU™.

During the offline data pipeline and model training phase 410, data for predefined feature scenarios 409 associated with a set of pre-defined features are extracted to be used for training a number of dynamic models 411. Once the dynamic models are trained, the dynamic models can be evaluated offline using historical driving statistics. Based on the outputs 413 of the dynamic models and the ground truths, dynamic models can be graded and a dynamic model with the highest score can be selected 415.

In one embodiment, the selected dynamic model can be evaluated again against driving statistics from a number of controlled testing scenarios so that the dynamic model can be further refined. The controlled testing scenarios can represent a variety of combinations of values from driving parameter of ADV for which the dynamic model has been trained.

Examples of the driving parameters can include braking, accelerating, idle speeding, reverse driving, driving straight, left turn or right turn, U-turn, lane changing, and parking driving. Each driving parameter can have multiple values. A value from one parameter or a combination of values from multiple parameters constitutes a controlled testing scenario.

Inferences can be performed by the dynamic model using driving statistics from the controlled testing scenarios. Outputs of the dynamic model can be compared with the ground truths for each controlled testing scenario. The performance of the dynamic model on each controlled testing scenario can be graded, and those controlled testing scenarios that receive a score below a predetermined threshold will be identified.

Further, based on the performance scores of the controlled testing scenarios, driving parameters or features used to train the dynamic model can also be ranked, and one or more features for which the dynamic model fails to reach a predetermined performance threshold can be identified. The first steps for ranking the features includes determining all the controlled feature scenarios for a feature; comparing the ground truth values for each controlled feature scenario and the expected value generated by the dynamic model in response to receiving that controlled feature scenario as an input; calculating the root mean squared errors or transformed values thereof (e.g., performance scores based on the root mean squared errors); ranking the features based on the root mean squared errors or transformed values; and identifying one or more features that each receive a performance score lower than a predetermined threshold.

After the one or more features or one or more feature scenarios are identified, the automatic loop of training the dynamic model can continue by extracting 409 additional data from historical driving statistics, such as those logged by the data logging 407, for use in retraining the dynamic model.

The above process can be repeated iteratively until the dynamic model performs satisfactorily according to a set of predetermined requirements, e.g., no feature scenario receives a score lower than 90 out of 100.

The dynamic model is specifically trained for autonomously driving a particular ADV or a particular type or model of ADV. The dynamic model can be a neural network model, which may be represented by a linear regression, multilayer perception, or recurrent neural network model. The driving statistics collected from various vehicles can include various control commands (e.g., throttle, brake, steering commands) issued and responses or states of the vehicles at different points in time.

As shown in FIG. 4, in the online simulation and grading phase 420, the trained dynamic model can be put into a simulator, where a simulation with control-in-loop process 419 can be implemented to identify issues from outputs 417 of the dynamic model for use in determining whether future training of the dynamic model is needed.

Note that vehicle data generation phase 406, offline model training phase 410, and simulation phase 420 may be performed in different computing nodes, such as, for example, different cloud servers. Alternatively, they can be performed by different nodes of a cluster (e.g., application servers or backend servers behind a Web server).

FIG. 5 illustrates an example training data extraction plan for training a dynamic model in accordance with an embodiment. The training data extraction plan can include a number of features (e.g., speed, accelerator and steering angle) and a number of equally-spaced ranges for feature. These ranges are used to extract data from a training data source to create feature scenarios for use in training a dynamic model. This plan is an example illustrating how data can be extracted for model training. Those skilled in the art would appreciate that a larger number of features, and a larger number of equally-space value ranges for each feature can be used. The driving plan can be used to extract data that is more balanced to cover a variety of driving situations. Such training data can improve the inference accuracy of a trained dynamic model.

In one embodiment, using data extracted according to the data plan, multiple dynamic models can be trained. Each dynamic model can be a different type of neutral network. Alternatively, the multiple dynamic models can be of the same type of neural network but with different depths of layers.

FIG. 6 illustrates examples of controlled testing scenarios for evaluating a dynamic model in accordance with an embodiment. The controlled testing scenarios include longitudinal testing scenarios 601, lateral testing scenarios 603, and joint testing scenarios 605. The controlled testing scenarios are designed to generate driving statistics to evaluate the dynamic model that has been trained using data extracted using the training data extraction plan in FIG. 5. When a vehicle corresponding to the dynamic model is manually maneuvered under each of the controlled testing scenarios, driving statistics can be generated.

Using the "left/right turn" testing scenarios as an example, the positive numbers (e.g., +30 and +60) means that a human driver shall turn the steering wheel to the right, while the negative number means that the human driver shall turn the steering wheel to the left. Each of the positive numbers or negative numbers represents a controlled testing scenario. The "right-turn" or "left-turn" is a feature of the vehicle in this disclosure.

For example, when the human driver turns the steering wheel 30 degrees to the right, the vehicle may actually turn a certain degree to the right. The 30 degree and the angle that the vehicle actually turns can be collected as part of the driving statistics for evaluating the dynamic model. The angle that the vehicle actually turns is the ground truth.

FIG. 7 illustrates metrics for evaluating a dynamic model in accordance with an embodiment. The example evaluation metrics include three categories 701, 703 and 705, each category including a number of features. For example, the longitudinal error category 701 includes acceleration and velocity. For the feature of "acceleration", there can be a number of controlled testing scenarios (e.g., throttle 20% at speed 0 mph and 10 mph etc.). Each of the controlled testing scenarios can have a corresponding ground truth value. When each testing scenario is fed into the dynamic model, an expected value can be generated. The difference between the expected value and the ground truth value is the error. The differences between the testing scenarios for the feature and the ground truth values can be used to compute a root mean square error.

As shown in FIG. 7, the expected root mean square error (RMSE) for the feature of acceleration is expected to be less than throttle 10%. This expected value and the actual RMSE can be used to compute a performance score for acceleration. A smaller RMSE means a better performance score.

Figure 8:
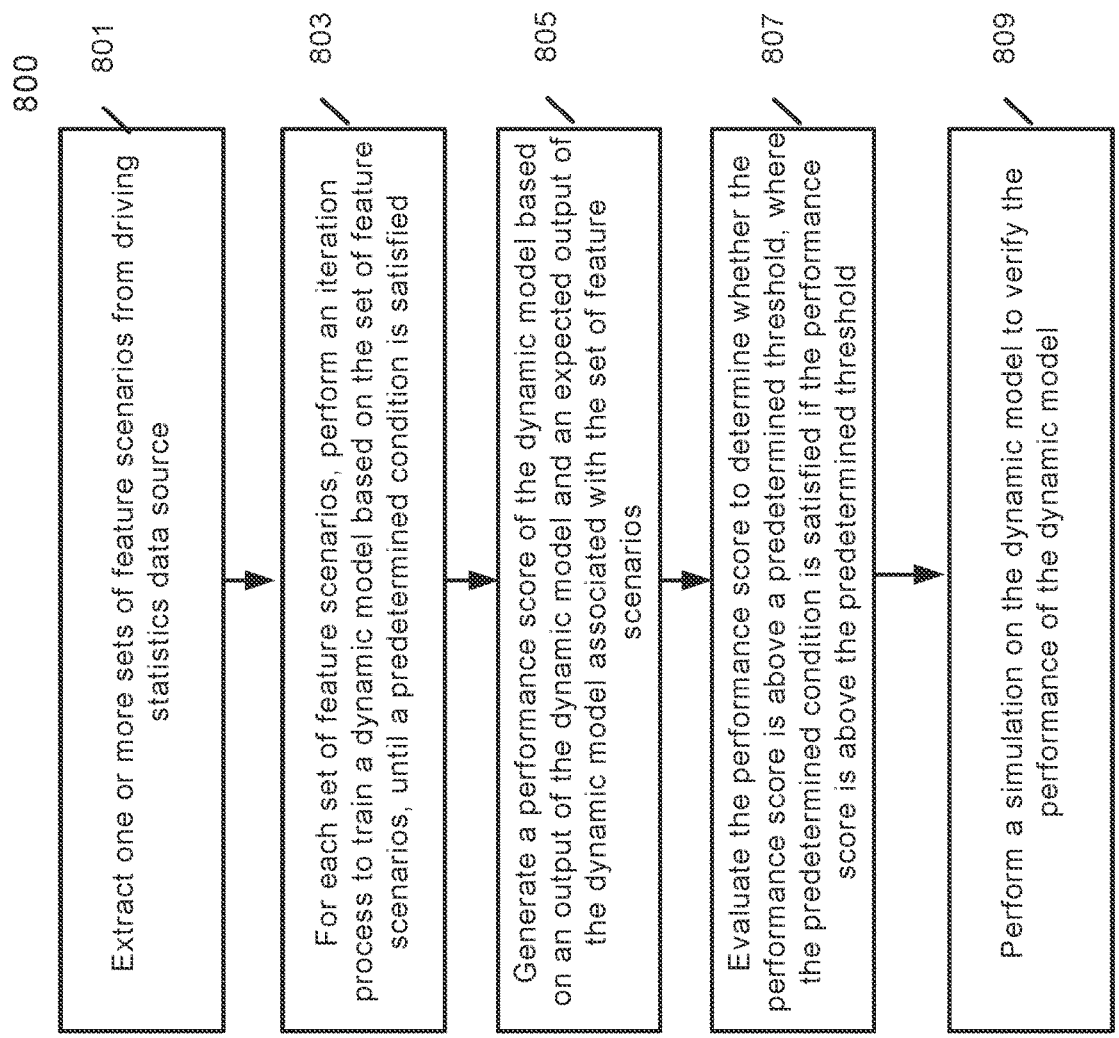
FIG. 8 is a flow diagram illustrating an example process of training a dynamic model in accordance with an embodiment.

FIG. 8 is a flow diagram illustrating an example process of training a dynamic model in accordance with an embodiment. Process 600 may be performed by processing logic which may include software, hardware, or a combination thereof. Process 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, process 600 may be performed by one or more modules or components illustrated in FIG. 3, such as the dynamic model evaluation module 305.

Referring to FIG. 8, in operation 601, one or more sets of predefined feature scenarios are extracted from the driving statistics data. In operation 603, an iteration process is performed to train a dynamic model until a predetermined condition has been satisfied. In operation 605, a performance score is calculated using a predetermined scoring algorithm for the dynamic model based on an output of the dynamic model and an expected output of the dynamic model corresponding to the set of feature scenarios. In operation 607, the performance score is evaluated to determine whether the performance score is above a predetermined threshold. When the performance score is above the predetermined threshold, the predetermined condition of the iteration process is satisfied, where the iteration ends. In operation 609, a simulation is performed using the trained dynamic model to verify and confirm the performance of the dynamic model. If the performance of the simulation is poor, the dynamic model may be retrained.

Figure 9:
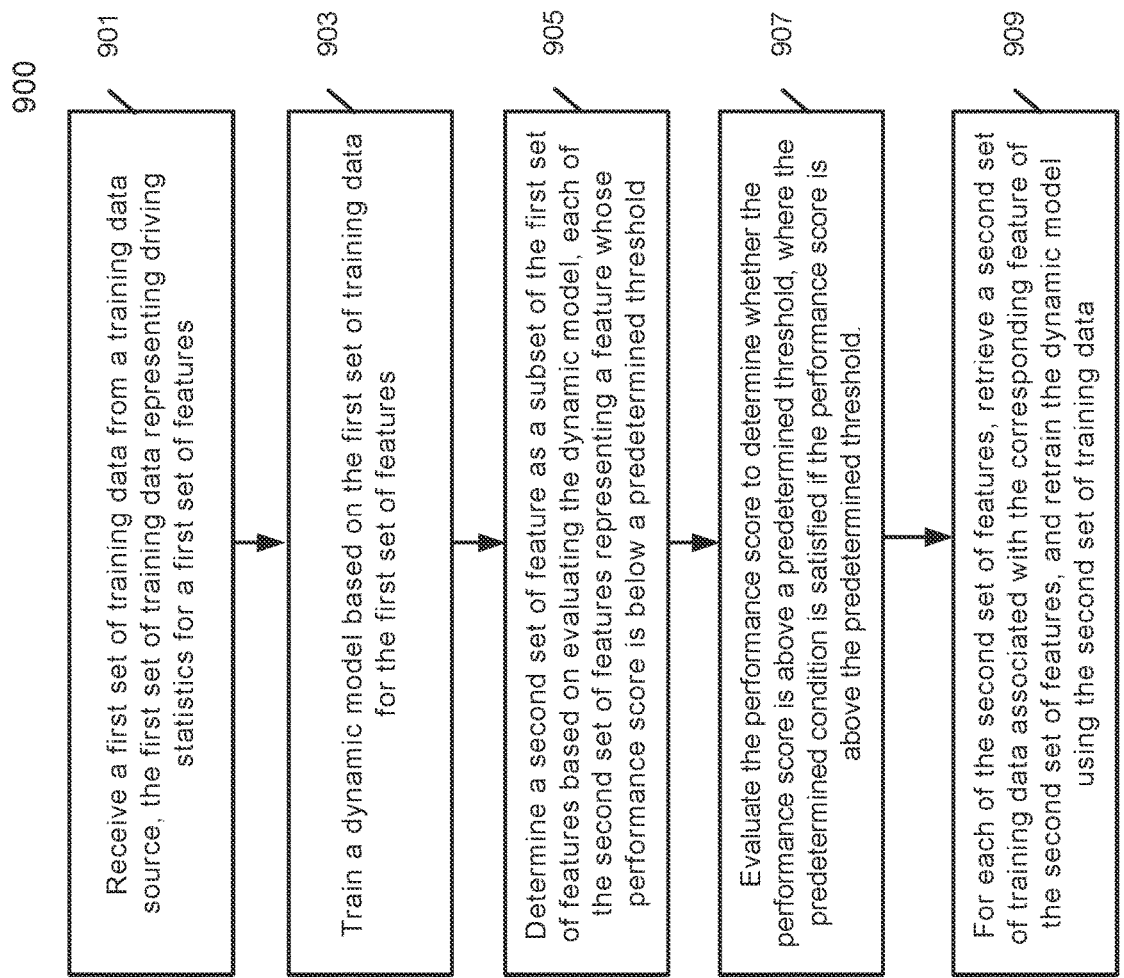
FIG. 9 is a flow diagram illustrating another example process of training a dynamic model in accordance with an embodiment.

FIG. 9 is a flow diagram illustrating another example process of training a dynamic model in accordance with an embodiment. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, process 600 may be performed by one or more modules or components illustrated in FIG. 3, such as the dynamic model evaluation module 305.

Referring to FIG. 7, in operation 701, the processing logic receives a first set of training data from a training data source, the first set of training data representing driving statistics for a first set of features. In operation 703, a dynamic model is trained based on the first set of training data for the first set of features. In operation 705, the processing logic determines a second set of features as a subset of the first set of features based on evaluating the dynamic model, each of the second set of features representing a feature whose performance score is below a predetermined threshold. In operation 707, for each of the second set of features, the processing logic can retrieve a second set of training data associated with the corresponding feature of the second set of features, and retrains the dynamic model using the second set of training data.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
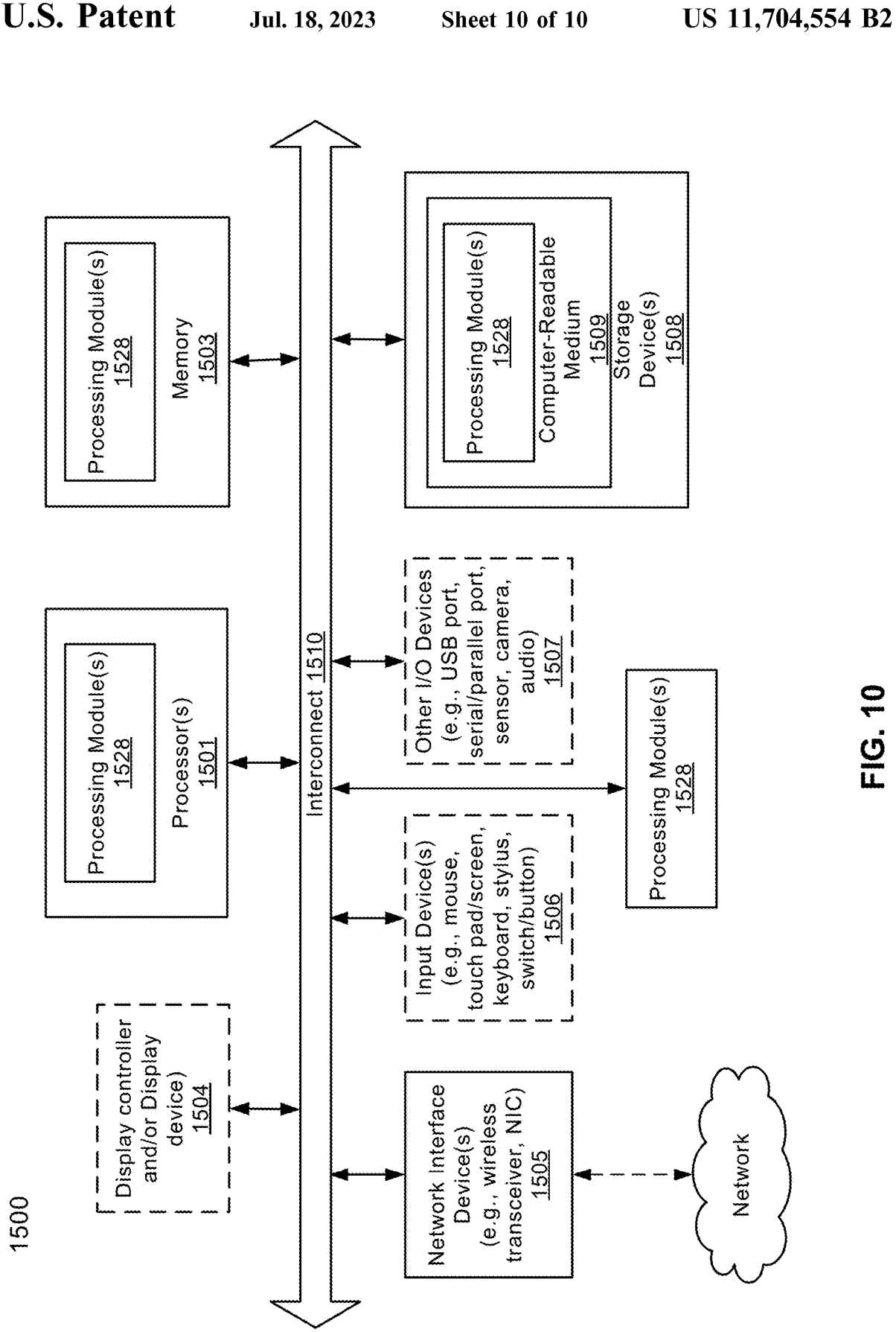
FIG. 10 is a block diagram illustrating an example of a data processing system which may be used with one embodiment.

FIG. 10 a block diagram illustrating an example of a data processing system which may be used with one embodiment of the disclosure. For example, system 1500 may represent any of data processing systems described above performing any of the processes or methods described above, such as, for example, the automated dynamic model training module 124 in FIG. 3. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as the training controller 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICs, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of training dynamic models for autonomous driving vehicles (ADVs), comprising:

extracting, from a training data source, a first set of training data for a first set of feature features, wherein each of the first set of features is a driving command, wherein the extracting of the first set of training data from the training data source includes determining a plurality of equally-spaced value ranges for each driving command, and selecting a value from each of the plurality of equally-spaced value ranges for the driving command;

training a dynamic model based on the first set of training data for the first set of features;

determining a second set of features as a subset of the first set of features based on comparing an actual future state of the dynamic model and an expected future state of the dynamic model in response to testing data for each of the first set of features, each of the second set of features being a feature for which a performance score of the dynamic model is below a predetermined threshold;

for each of the second set of features, iteratively performing the following operations until the performance score of the dynamic model for that feature reaches the predetermined threshold:

extracting, from the training data source, a second set of training data, wherein the extracting of the second set of training data includes determining a plurality of equally-spaced value ranges for the driving command corresponding to the feature, and selecting a value from each of the plurality of equally-spaced value ranges for the driving command; and retraining the dynamic model using the second set of training data.

2. The method of claim 1, wherein the determining of the second set of features as the subset of the first set of features based on comparing the actual future state of the dynamic model and the expected future state of the dynamic model for each of the first set of features further comprises:

providing testing data for each of the first set of features to the dynamic model that has been trained using the first set of training data;

comparing the actual future state of the dynamic model in response to the testing data for the feature against the expected future state of the dynamic model in response to the testing data for the feature, wherein the actual future state is an actual output of the dynamic model in response to the testing data, and the expected future state is a ground truth output of the ADV in response to the testing data, wherein the testing data and the ground truth output for the feature is generated from the training data source;
computing a root mean squared error for the actual output;
computing a performance score for the actual output; and
determining the second set of features based on their performance scores in comparison to the predetermined threshold.

3. The method of claim 1, wherein the dynamic model is one of a plurality of dynamic models trained using the first set of training data from the training data source, and wherein the dynamic model is a model that receives a highest score based on inference performance.

4. The method of claim 3, wherein the dynamic model is a neural network model represented by one of a linear regression, a multilayer perceptron (MLP), or a recurrent neural network (RNN).

5. The method of claim 1, wherein the training data source stores driving statistics collected from a variety of vehicles driven by human drivers, wherein the driving statistics include information indicating driving commands issued and responses of the vehicles captured by sensors of the vehicles at different points in time.

6. A non-transitory machine-readable medium having instructions stored therein, which when executed by a processor, causing the processor to perform operations of training dynamic models for an autonomous driving vehicle (ADV), the operations comprising:
   extracting, from a training data source, a first set of training data for a first set of features, wherein each of the first set of features is a d driving command, wherein the extracting of the first set of training data from the training data source includes determining a plurality of equally-spaced value ranges for each driving command, and selecting a value from each of the plurality of equally-spaced value ranges for the driving command;
   training a dynamic model based on the first set of training data for the first set of features;
   determining a second set of features as a subset of the first set of features based on comparing an actual future state of the dynamic model and an expected future state of the dynamic model in response to testing data for each of the first set of features, each of the second set of features being a feature for which a performance score of the dynamic model is below a predetermined threshold;
   for each of the second set of features, iteratively performing the following operations until the performance score of the dynamic model for that feature reaches the predetermined threshold:
      extracting, from the training data source, a second set of training data, wherein the extracting of the second set of training data includes determining a plurality of equally-spaced value ranges for the driving command corresponding to the feature, and selecting a value from each of the plurality of equally-spaced value ranges for the driving command; and
      retraining the dynamic model using the second set of training data.

7. The non-transitory machine-readable medium of claim 6, wherein the determining of the second set of features as the subset of the first set of features based on comparing the actual future state of the dynamic model and the expected future state of the dynamic model for each of the first set of features further comprises:
   providing testing data for each of the first set of features to the dynamic model that has been trained using the first set of training data;
   comparing the actual future state of the dynamic model in response to the testing data for the feature against the expected future state of the dynamic model in response to the testing data for the feature, wherein the actual future state is an actual output of the dynamic model in response to the testing data, and the expected future state is a ground truth output of the ADV in response to the testing data, wherein the testing data and the ground truth output for the feature is generated from the training data source;
   computing a root mean squared error for the actual output;
   computing a performance score for the actual output; and
   determining the second set of features based on their performance scores in comparison to the predetermined threshold.

8. The non-transitory machine-readable medium of claim 6, wherein the dynamic model is one of a plurality of dynamic models trained using the first set of training data from the training data source, and wherein the dynamic model is a model that receives a highest score based on inference performance.

9. The non-transitory machine-readable medium of claim 8, wherein the dynamic model is a neural network model represented by one of a linear regression, a multilayer perceptron (MLP), or a recurrent neural network (RNN).

10. A data processing system, comprising:
    a processor; and
    a memory coupled to the processor to store instructions, which when executed by a processor, cause the processor to perform operations of training dynamic models for an autonomous driving vehicle (ADV), the operations comprising:
    extracting, from a training data source, a first set of training data for a first set of features, wherein each of the first set of features is a driving command, wherein the extracting of the first set of training data from the training data source includes determining a plurality of equally-spaced value ranges for each driving command, and selecting a value from each of the plurality of equally-spaced value ranges for the driving command;
    training a dynamic model based on the first set of training data for the first set of features;
    determining a second set of features as a subset of the first set of features based on comparing an actual future state of the dynamic model and an expected future state of the dynamic model in response to testing data for each of the first set of features, each of the second set of features being a feature for which a performance score of the dynamic model is below a predetermined threshold;
    for each of the second set of features, iteratively performing the following operations until the performance score of the dynamic model for that feature reaches the predetermined threshold:
       extracting, from the training data source, a second set of training data, wherein the extracting of the second set of training data includes determining a plurality of equally-spaced value ranges for the driving command corresponding to the feature, and selecting a value from each of the plurality of equally-spaced value ranges for the driving command; and
       retraining the dynamic model using the second set of training data.

11. The data processing system of claim 10, wherein the determining of the second set of features as the subset of the first set of features based on comparing the actual future state of the dynamic model and the expected future state of the dynamic model for each of the first set of features further comprises:
   providing testing data for each of the first set of features to the dynamic model that has been trained using the first set of training data;
   comparing the actual future state of the dynamic model in response to the testing data for the feature against the expected future state of the dynamic model in response to the testing data for the feature, wherein the actual future state is an actual output of the dynamic model in response to the testing data, and the expected future state is a ground truth output of the ADV in response to the testing data, wherein the testing data and the ground truth output for the feature is generated from the training data source;
   computing a root mean squared error for the actual output;
   computing a performance score for the actual output; and
   determining the second set of features based on their performance scores in comparison to the predetermined threshold.

12. The data processing system of claim 10, wherein the dynamic model is one of a plurality of dynamic models trained using the first set of training data from the training data source, and wherein the dynamic model is a model that receives a highest score based on inference performance.

13. The data processing system of claim 12, wherein the dynamic model is a neural network model represented by one of a linear regression, a multilayer perceptron (MLP), or a recurrent neural network (RNN).

14. The data processing system claim 10, wherein the training data source stores driving statistics collected from a variety of vehicles driven by human drivers, wherein the driving statistics include information indicating driving commands issued and responses of the vehicles captured by sensors of the vehicles at different points in time.

* * * * *